April 16, 1935.  H. R. RAFTON  1,997,915
METHOD AND APPARATUS FOR SEPARATING AND WASHING MATERIALS
Filed July 17, 1929   5 Sheets-Sheet 1
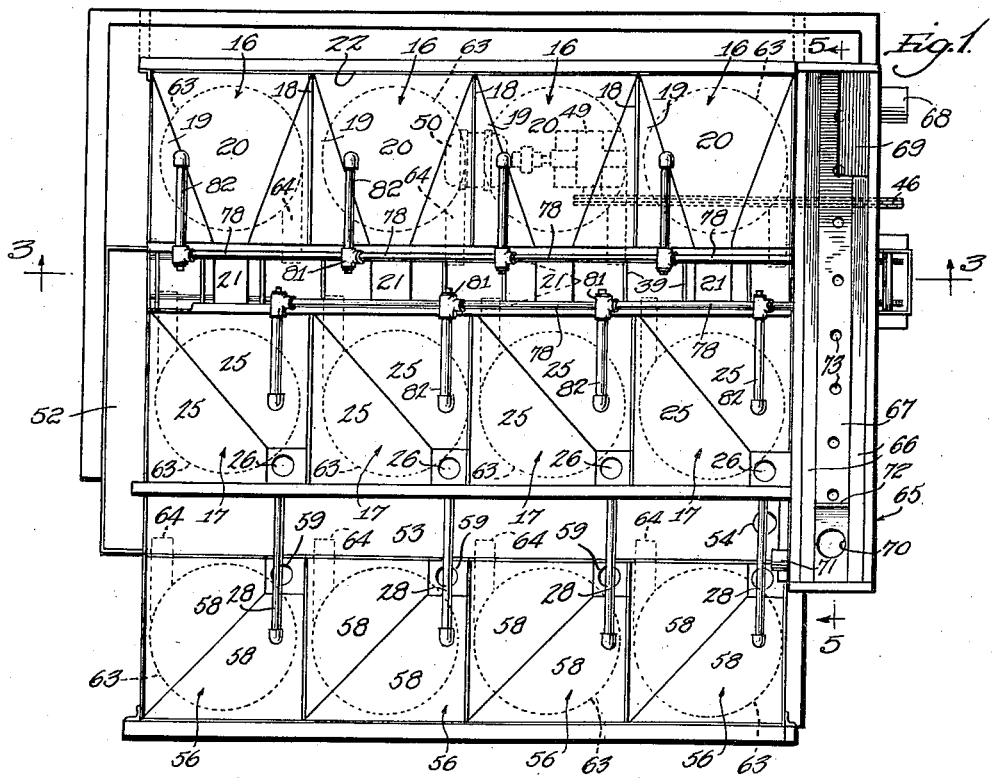
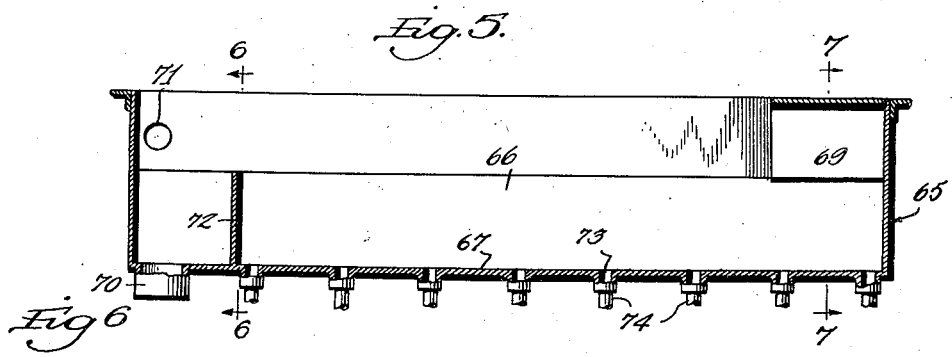
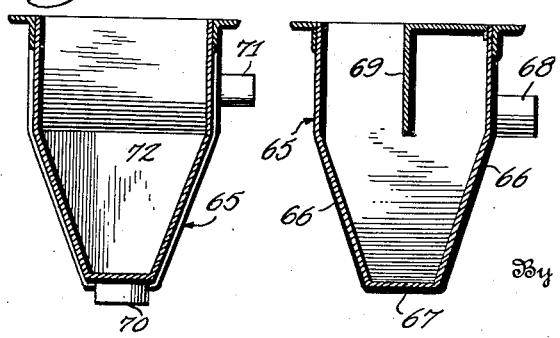
Inventor
HAROLD R. RAFTON
By C. L. Parker Jr.
Attorney April 16, 1935. H. R. RAFTON 1,997,915
METHOD AND APPARATUS FOR SEPARATING AND WASHING MATERIALS
Filed July 17, 1929 5 Sheets-Sheet 2

Inventor
HAROLD R. RAFTON
By C. R. Parker, Jr.
Attorney

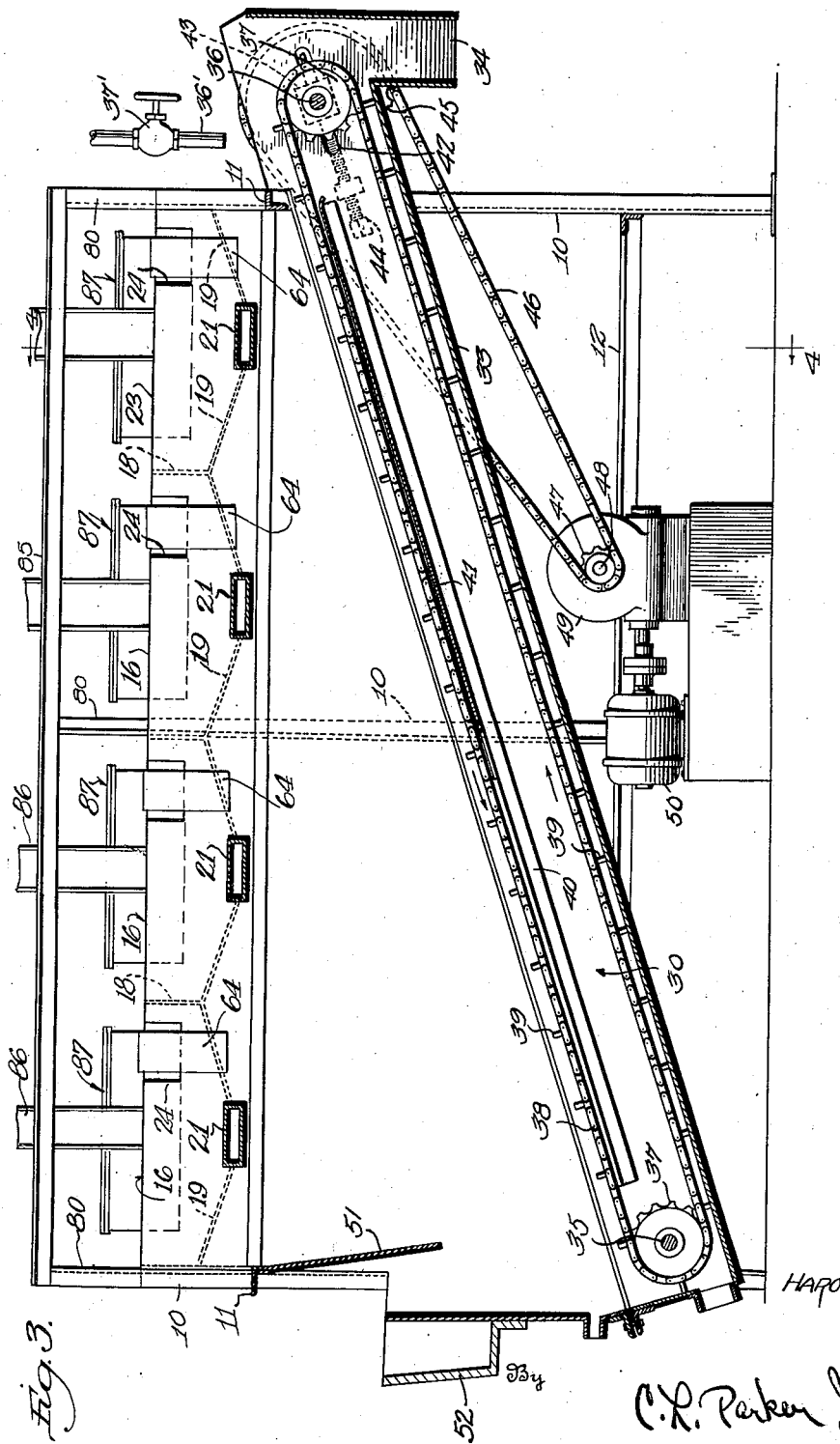

April 16, 1935.  H. R. RAFTON  1,997,915
METHOD AND APPARATUS FOR SEPARATING AND WASHING MATERIALS
Filed July 17, 1929  5 Sheets-Sheet 4
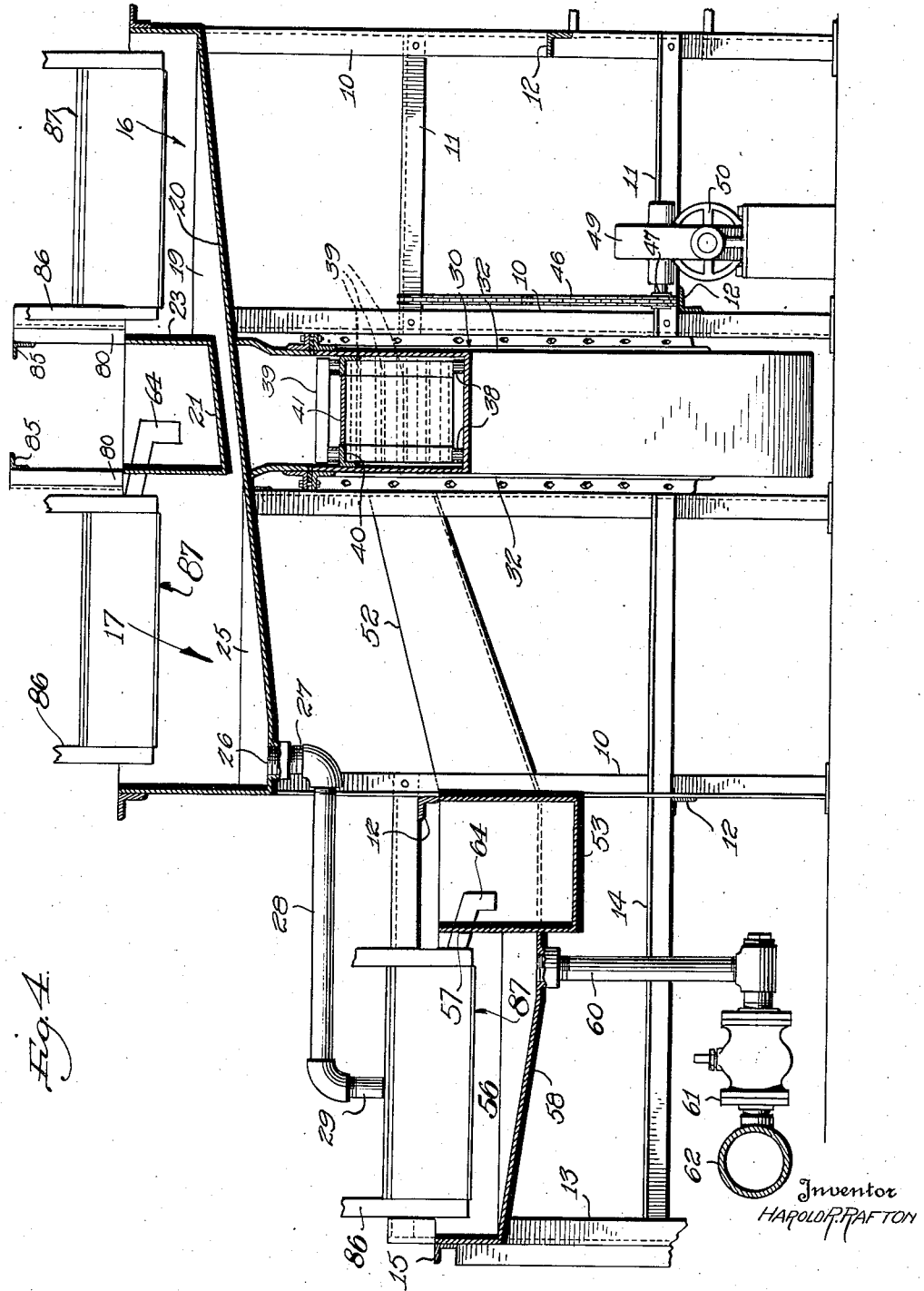

April 16, 1935.  H. R. RAFTON  1,997,915
METHOD AND APPARATUS FOR SEPARATING AND WASHING MATERIALS
Filed July 17, 1929   5 Sheets-Sheet 5

Inventor
HAROLD R. RAFTON
By
C. L. Parker Jr.
Attorney

Patented Apr. 16, 1935

1,997,915

UNITED STATES PATENT OFFICE 1,997,915

METHOD AND APPARATUS FOR SEPARATING AND WASHING MATERIALS

Harold Robert Rafton, Andover, Mass., assignor to Rafton Engineering Corporation, a corporation of Massachusetts Application July 17, 1929, Serial No. 379,004

3 Claims. (Cl. 209—268)

This invention relates to method and apparatus for separating and washing materials, and more particularly slurries of the type occurring in the manufacture of paper pigments.

In the manufacture of paper pigments, the concentration of pigment in the slurry may be as high as twenty per cent. or more by weight, and the separation of grit from the fine particles and solubles in the slurry is attended with difficulties, particularly in providing continuously operating means of substantial capacity. In my copending application Serial No. 359,943, filed May 2nd, 1929, I have shown, described and claimed a gyratory screening device suitable for use with a gyratory frame which is particularly adapted for this purpose, but it is necessary to provide a number of the screening devices in order to separate relatively large quantities of slurry, the capacity of each screening device being relatively limited. The present invention contemplates in part the provision of an apparatus which is adapted for use in connection with the screening device disclosed in my copending application referred to, but is not necessarily limited to such a device.

An important object of the present invention is to provide a novel method of separating materials containing solids and liquids wherein a substantially complete separation is readily effected.

A further object is to provide a method of the character referred to which is substantially continuous in operation and which is particularly adapted for handling relatively large quantities of material.

A further object is to provide a method of separating grit from the finer particles and solubles in paper pigment slurries and wherein the separation is substantially complete and relatively rapidly carried out.

A further object is to provide a novel form of apparatus for separating solid material of substantial size from liquids and finer particles, particularly with reference to the separation of grit from the finer particles and solubles contained in the slurries occurring in the manufacture of paper pigments.

A further object is to provide a novel apparatus of the character referred to which is substantially continuous in operation and is adapted to effect the relatively rapid separation of large quantities of material.

A further object is to provide an apparatus of novel character wherein the material is subjected to an initial treatment to effect a substantially complete separation of the greater portion of the finer particles and solubles in the slurry from the grit and wherein the grit thus separated is subjected to the action of a current of a washing liquid to effect a substantially complete separation from the grit of the solubles and/or finer particles adhering thereto after the initial separation.

A further object is to provide a novel form of apparatus of the character referred to having safety means for positively preventing any coarse material or grit from finding its way into the fine material and solubles as would be caused by the breaking of a screen, the overloading of an initial separator, etc.

A further object is to provide novel mechanical means for initially separating the greater portion of the finer material and solubles from the grit in slurries, and for conveying the grit thus separated to a discharge point and at the same time subjecting the grit to the action of a washing liquid to separate therefrom the solubles and/or finer materials adhering thereto.

A further object is to provide a combined washing machine and classifier particularly adapted for use in the treatment of slurries occurring in the manufacture of paper pigments whereby the grit in such slurries may be separated therefrom substantially completely free from adhering fine material and solubles.

A further object is to provide an apparatus of the character referred to wherein a plurality of initial mechanical separating devices is employed to receive the slurry, and to provide novel feeding means for the separators to effect a substantially uniform and constant feed thereto without the usual settling of the slurry and the consequent choking of the feed pipes.

Other objects and advantages of the invention will become apparent during the course of the following description.

I have discovered that the slurries occurring in the manufacture of paper pigments advantageously may be subjected to a mechanical separating action to substantially completely separate the grit from the fine particles and solubles in the slurry, but that the efficiency of such separation is somewhat disadvantageously affected by the fact that small quantities of the other materials adhere to the grit and are discarded therewith.

I have further discovered that after the greater portion of the fine particles and solubles have been separated from the grit, thus leaving the latter with only small quantities of fines and solubles adhering thereto, the grit thus separated advantageously may be subjected to the action of a relatively small quantity of a washing liquid such as water to substantially completely remove the adhering material from the grit so as to permit its recovery without undue dilution.

The method resulting from such discovery consists in subjecting the slurries to the action of mechanical separating means to effect a substantially complete separation of the greater portion of the fines and solubles from the grit and the subjection of the grit thus separated to the action of a preferably flowing stream of a washing liquid such as water to effect a washing action whereby only relatively clean grit will be discarded. The grit is preferably moved during such washing action as by means of a discharging conveyor, and the movement of the grit is preferably carried out counter to the current of the washing liquid.

As previously stated, it has been found that such a washing action is substantially complete in its results, and may be effected with a relatively slow flow of water so as not to unduly dilute the fine material and solubles, and these materials, flowing counter to the movement of the grit, are readily recoverable for commercial use and may preferably be mixed with the slurry in the tank from which the headbox of the initial separating means is fed.

In the drawings I have shown one form of apparatus elements particularly adapted for practicing the method. In this showing, Figure 1 is a plan view, parts being omitted, Figure 2 is an end elevation, parts being omitted, Figure 3 is a section on line 3—3 of Figure 1, parts being omitted, Figure 4 is a transverse section on line 4—4 of Figure 3, parts being omitted, Figure 5 is a section on line 5—5 of Figure 1, Figure 6 is a detail section on line 6—6 of Figure 5.

Figure 7 is a similar view on line 7—7 of Figure 5,

Figure 2:
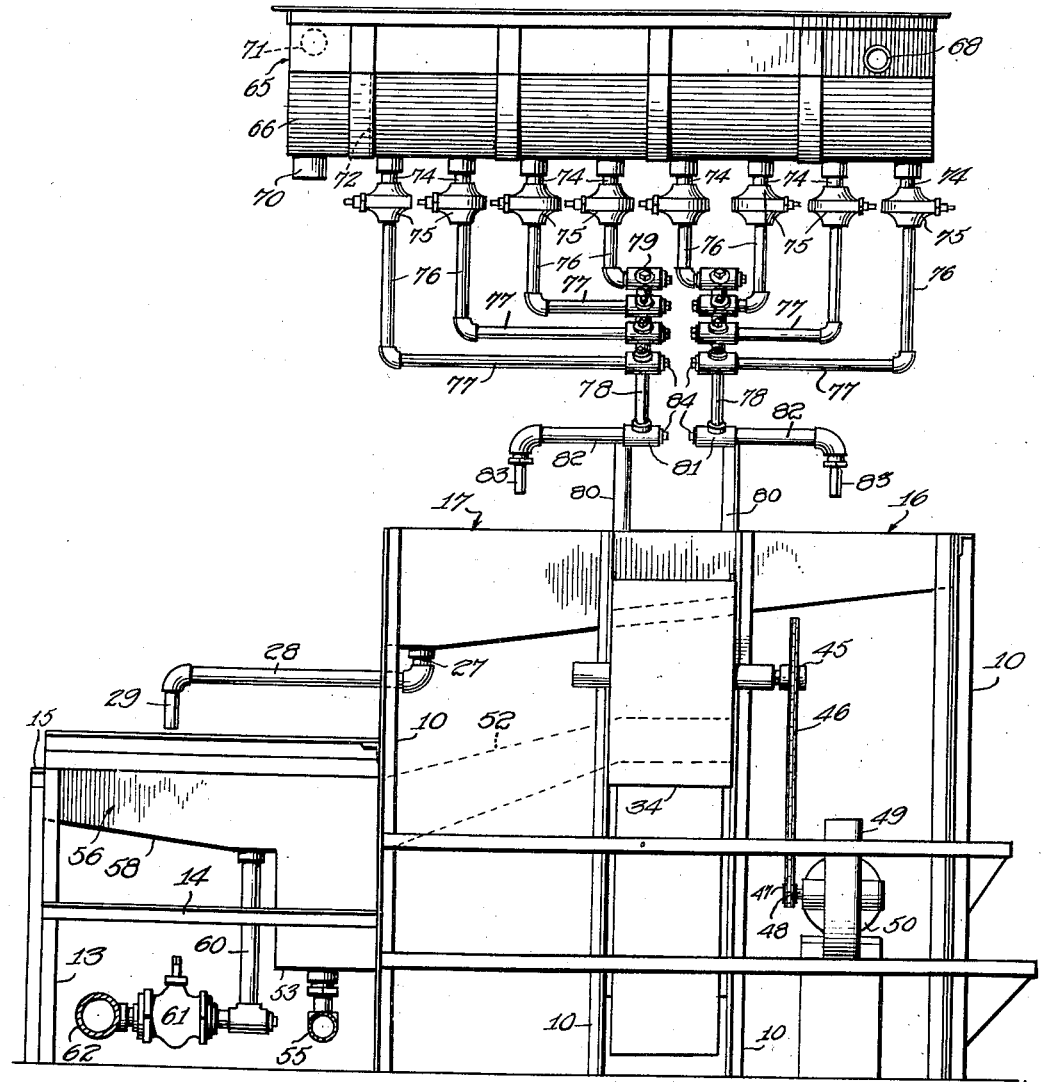

Referring to Figures 1 to 4 inclusive, the numeral 10 designates a plurality of vertical posts connected by transverse braces 11 and longitudinal braces 12 forming a main frame. An auxiliary frame is arranged adjacent the main frame and similarly includes vertical posts 13 connected by horizontal braces 14 and longitudinal braces 15.

The main frame of the apparatus is provided at one side of the longitudinal center thereof with a plurality of pans or containers each indicated as a whole by the numeral 16, and at the opposite side of its longitudinal center with a second series of pans or containers 17 somewhat similar in character. Each of the pans 16 is provided with side walls or partitions 18, and from each of the partitions, the bottom of each pan slopes downwardly as at 19 toward an intermediate bottom 20 which slopes downwardly toward the longitudinal center of the apparatus for communication with a transverse conduit 21. Each pan 16 is further provided with outer and inner walls 22 and 23 the latter of which is notched as at 24 for a purpose to be described.

Each of the pans 17 is arranged opposite one of the pans 16 and is somewhat similar in construction thereto. As distinguished from the pans 16, however, each pan 17 is provided with downwardly sloping bottoms 25 to feed material toward a discharge opening 26 arranged in one corner of the pan and communicating with an outlet pipe 27 (see Figure 4). Each pipe 27 is connected to a horizontally extending pipe 28 which terminates in a downturned end 29, for a purpose to be described. The pans 17 also are provided in their inner walls with notches corresponding to the notches 24.

A longitudinally extending trough 30 is arranged centrally of the main frame and is supported in any suitable manner between the central pairs of posts 10. The trough 30 includes side walls 32 and a sloping bottom 33, such bottom being clearly shown in Figure 3 of the drawings and being inclined upwardly toward the outlet end of the apparatus where the trough 30 communicates with a vertically arranged discharge spout 34.

Shafts 35 and 36 are arranged in opposite ends of the trough 30 and support suitable sprockets 37 about which pass endless chains 38. These chains carry scraper elements 39 as clearly shown in Figure 3, and the scrapers of the lower runs of the chains travel upon the bottom 33 to move material therealong toward the discharge spout 34. The upper runs of the chains 38 may travel upon trackways 40 in the form of angle irons secured to the side walls 32. From the transverse center of the trough 30 to the outlet end thereof, a plate 41 preferably extends across the trough beneath the upper runs of the chains 38, for a purpose to be described. Water or other washing liquid is supplied to the upper end of the trough 30 from a suitable source through a pipe 36' controlled by the valve 37'.

The shaft 36 extends through slots 42 formed in the side walls of the trough, and the outer ends of the shaft are preferably supported in bearings 43 adjustable by screws 44 to take up slack in the chains 38. A sprocket 45 is connected to one end of the shaft 36. A drive chain 46 passes around the sprocket 45 and around a driving sprocket 47 carried by a shaft 48 extending from a suitable speed reduction device 49. Power for the speed reduction device may be furnished by any suitable type of motor 50.

Adjacent the end of the apparatus opposite the discharge spout 34 a baffle plate 51 extends downwardly into the trough 30, and the trough communicates beneath the baffle plate 51 with a transverse duct 52 extending along the end of the apparatus and communicating at its lower end with a longitudinal trough 53 arranged outwardly of the main frame posts 10. The bottom of the trough 53 inclines downwardly toward its end opposite the duct 52 and at that end is provided with an outlet opening 54 communicating with a take-off pipe 55 for a purpose to be described.

The auxiliary frame of the apparatus supports a plurality of auxiliary pans or receptacles 56 which correspond in arrangement and are similar to the pans 17. One wall 57 of the trough 53 forms the inner wall of the pans 56 and is provided with notches similar to the notches 24 for a purpose to be described. Each pan 56 is provided with sloping bottom portions 58 to feed material in the pan toward a discharge opening 59 communicating with a take-off pipe 60 (see Figures 2 and 4).

Each of the pipes 60 communicates through a valve 61 with a common take-off pipe 62 from which material flowing from the pans 56 may be collected.

Each of the pans 16, 17 and 56 is adapted to receive a separating device or screen such as a gyratory riddle employing the screening device disclosed in my copending application Serial No. 359,943, referred to above. These screens are shown in dotted lines, indicated by the numeral 63. The screens are preferably of the gyratory type disclosed in my copending application referred to, the fine material and solubles being discharged through a bottom screening element into the respective fans, while the coarse material is discharged from above the screen by an outlet spout 64. The outlet spouts 64 extend through the notches 24 in the walls of pans 16, 17 and 56 respectively, and discharge into trough 30 in the case of pans 16 and 17, and into trough 53 in the case of pans 56. I prefer to employ screens of the type referred to because they have been found to be particularly efficient in operation, but it will become apparent that any suitable riddle or other separating device may be employed.

Referring to Figures 1, 2, 5, 6 and 7, the numeral 65 designates a headbox as a whole which has been found to be particularly satisfactory for uniformly supplying material to be separated and washed to the various separators 63. The headbox is preferably arranged transversely of the apparatus above the discharge end thereof, as shown in Figure 2. The headbox includes side walls 66, the lower portions of which are inclined downwardly toward each other to provide a relatively narrow flat bottom 67. Material is fed into the headbox through an inlet pipe 68 communicating therewith through one of the side walls adjacent the end of the headbox, and a baffle plate 69 extends across the top of the headbox and downwardly substantially centrally thereof, as shown in Figure 7, to prevent the incoming material from splashing out of the box.

The bottom wall of the headbox is provided adjacent the end thereof opposite the inlet pipe 68, with an outlet pipe 70, and the headbox also is preferably provided in a side wall thereof, above the discharge pipe 70, with an overflow pipe 71 which is adapted to prevent the headbox from overflowing in the event of the clogging of the pipe 70 or the feeding of the material into the headbox at too rapid a rate.

At a point spaced slightly inwardly from the discharge end of the headbox, the latter is provided with a vertical wall 72 the height of which determines the height of the material in the headbox between the wall 72 and the inlet pipe 68. The bottom 67 of the headbox is provided with a plurality of openings 73 corresponding in number to the pans 16 and 17, and each opening 73 communicates with a take-off pipe 74. The openings 73 are spaced between the wall 72 and the end of the headbox adjacent the inlet pipe 68.

Each of the take-off pipes 74 is connected to a suitable manually controlled valve 75 which in turn, communicates with a vertical pipe 76. Each of the pipes 76 communicates with an inwardly extending horizontal pipe 77 which communicates in turn through a cross 79 with another pipe 78 arranged at right angles thereto, the pipes 78 being inclined downwardly to prevent plugging, and extending longitudinally of the separating apparatus above the central portion thereof. The various pipes 77 and 78 are arranged at different heights, as shown in Figure 2, as a matter of convenience and accessibility. Each of the pipes 78 is connected at its lower end to a T 81, one branch of which is connected to a horizontally extending pipe 82 provided at its extremity with a depending discharge nozzle 83. The bodies of the crosses 79, and the T's 81, are preferably provided with clean-out plugs 84 which may be removed to permit the tees and crosses to be cleaned when desired. The vertical angle irons 80, and the horizontal angle irons 85 attached thereto serve as a support for the piping system connected to the headbox.

Figure 8:
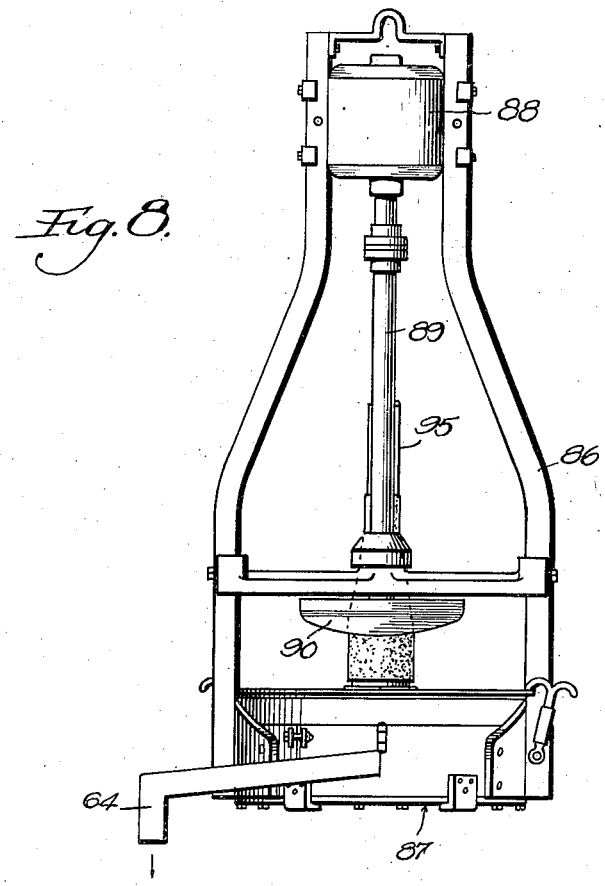
Figure 8 is a side elevation of a gyratory separating device adapted for use in connection with the apparatus, and, Figure 9 is a transverse vertical sectional view taken through the pan and associated elements of the gyratory separating device.
Figure 9:
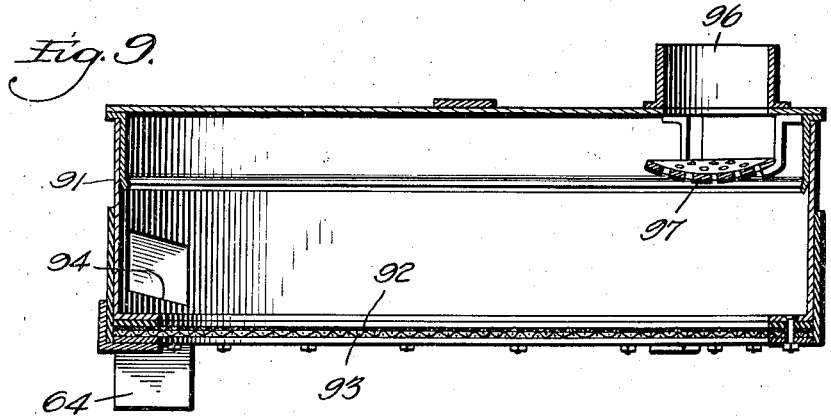

As previously stated, any suitable riddle or other separating device may be employed in connection with the apparatus, and in Figures 8 and 9 of the drawings I have illustrated a riddle of the type disclosed in my copending application Serial No. 359,943.

Referring to Figure 8, the numeral 86 designates a supporting framework as a whole to the lower end of which the separating device per se indicated as a whole by the numeral 87 is attached. A gyratory motion is imparted to the frame 86, and hence to the pan 87, by a motor 88 driving a shaft 89 having an eccentric weight 90 at its lower end.

Referring to Figure 9 it will be noted that the separator 87 comprises generally a cylindrical pan 91 in the lower portion of which is secured a screening element 92 backed up by a relatively heavy screen 93. Oversize material retained on the screen 92 is discharged from the pan 91 through an opening 94 which communicates with one of the discharge spouts 64 previously described. It will be apparent that the separator as a whole has been indicated diagrammatically by the numeral 63 in Figure 1 of the drawings. Accordingly it will be obvious that material passing through the screen 92 of each separating device falls downwardly to the associated pan 16, 17 or 56 and that oversize material will be discharged from the spouts of the separating devices into either the trough 30 or duct 53. Material is fed into the pan of each separator through a flexible pipe 95 connected to an inlet spout 96, and the incoming material is spread over the screen 92 by a spreader 97.

The operation of the apparatus is as follows:

The slurries or other materials to be treated are fed into the headbox 65 through the inlet pipe 68, this operation preferably taking place continuously. The material is permitted to accumulate in the headbox until it reaches the height of the upper edge of the wall 72, whereupon the valves associated with the piping connections are opened. It will be apparent that the maintenance of the height of the liquid a substantial distance above the discharge openings 73 insures a uniform supply of material to the pans 16 and 17 through the piping connections referred to. In order to insure the maintenance of the height of material in the headbox 65, material is preferably fed thereinto at a rate exceeding the rate of discharge of material through the pipes 74. The excess material overflows the wall 72 and is drained from the headbox through the pipe 70 and returned to the source of material. In the event material is fed too rapidly into the headbox 65, or the pipe 70 becomes clogged, the take-off pipe 71 comes into operation to take care of the excess material and thus prevent the headbox from overflowing.

Material discharged from the headbox flows downwardly through pipes 74, valves 75, pipes 76, 77 and 78, and thence through the pipes 82 to be discharged through the nozzles 83. The material is thus fed downwardly into the separating devices 63 associated with the pans 16 and 17, as will be apparent.

The separating devices operate to effect a substantially complete separation of the material. When the apparatus is used in connection with slurries occurring in the manufacture of paper pigments the fine material and solubles are separated from the grit and are fed downwardly through the screens 92 of the separating devices arranged over the pans 16 and 17 and are discharged to these pans. The coarse material such as the grit, is retained on the screens 92 and is progressively discharged from the separating devices through the spouts 64, and this material is discharged into the trough 30.

A washing liquid such as water is fed into the trough 30 through the pipe 36' and the liquid in the trough is maintained somewhat below the level of the upper end of the discharge spout 34, by virtue of the fact that the entrance to duct 52 is somewhat lower than the upper end of the discharge spout 34. The water and material collected thereby flows out of the trough 30 in a manner to be described, and since this flow takes place relatively slowly, the supply of water to the trough through the pipe 36' takes place at a correspondingly slow rate.

The coarse material falling into the trough 30 is subjected to a washing action by water therein, and accordingly the fine material and solubles which adhere to the grit will be substantially completely removed therefrom. The plate 41 is provided to prevent the grit falling into the trough adjacent the outlet end thereof from being removed from the trough before being completely washed. The scrapers 39 of the upper runs of the chains act to carry the grit falling upon the plate 41 toward the lower end of the trough 30 to insure the complete subjection of such grit to the washing action of the water.

The grit sinks down to the bottom of the trough 30 beneath the lower end of the plate 41 and is picked up by the scrapers 39 of the lower runs of the chains and moved upwardly toward the spout 34 to be discharged from the apparatus in a substantially clean condition.

The water enters at the discharge end of trough 30, passes downwardly between the bottom of the trough and plate 41, thus acting in a counter current manner to wash the grit being conveyed up the inclined bottom by the scrapers 39 attached to lower runs of the chains 38. The scrapers 39 attached to the upper runs of the chains serve to convey grit falling upon plate 41 to the lower end of plate 41, where the grit falls through an ascending stream of wash liquid. The scrapers 39 attached to the portions of the upper runs of the chains 38 between the lower end of plate 41 and sprocket 37 serve as an effective means of agitating slowly the descending grit in the ascending washing liquid, and thus promote the effective washing of the grit.

The flow of washing liquid into the apparatus is at a relatively slow rate, as it has been found that the apparatus functions effectively with relatively small quantities of washing liquid. Thus the flow of liquid into the duct 52 is sufficiently slow so that substantially no grit is carried over with the fine material in the washing liquid. Moreover the amount of washing liquid, being small in volume, can be finally introduced into the tank containing the original slurry, without substantial dilution of said slurry.

The water and material washed from the grit flows from the trough 30 through the end duct 52. Thus it will be apparent that the water fed into the apparatus moves from the discharge end of the apparatus toward the opposite end and accordingly the grit is subjected to a counter current of liquid to insure its thorough cleaning. The fine materials and solubles removed from the grit by the washing action flow from the duct 52 into the trough 53 and are discharged from the end thereof through the pipe 54.

The fine material and solubles separated from the grit by the devices 63 arranged over the pans 16 are deposited in these pans and flow into the pans 17 through the transverse ducts 21. This material accordingly is discharged from the pans 16 into the pans 17 where it mingles with the fine materials and solubles separated from the grit by the devices 63 arranged over the pans 17. The separated materials from each of the pans 17 flows therefrom through the openings 26 and pipes 27 and 28 and are thus discharged into the separating devices 63 arranged over the pans 56.

The auxiliary separating apparatus comprising the devices 63 arranged over the pans 56 is provided as a safety measure to prevent the discharging of fine materials and solubles containing any coarse material or grit which might be mixed therewith due to the breaking or overflowing of any of the screens of the devices 63 arranged over the pans 16 and 17. The auxiliary separating devices operate in the same manner as the separating devices of the main portion of the apparatus. The fine material and solubles will be deposited in the pans 56 and will flow therefrom through the outlet openings 59 into the pipes 60, from which the materials will be delivered to the take-off pipe 62 to be collected therefrom. Any coarse material which may have been deposited upon the screens of the pans 56 will be discharged through the spouts 64 of the devices 63 of the pans 56 into the trough 53.

It will be noted that for each two initial separating devices, but one auxiliary separating device is provided. The reason for this is that the capacity of the initial separating devices is limited owing to presence of grit in the slurry, but that the substantially grit-free slurry delivered from the initial separating devices passes much more rapidly through the auxiliary separating device, so that one auxiliary readily handles the effluent from two initial separating devices.

It will be apparent that under normal operating conditions substantially all of the material finding its way into the trough 53 will be in the form of fine material and solubles and if there should be any coarse material therein, as by the breakage or overflowing of an initial separating device, it will be present in only a relatively small percentage. All of the grit dropping into the trough 53 is drawn therefrom through the opening 54 and pipe 55 from whence it is returned to the source of supply to be rescreened and separated. The wash liquor coming from duct 52 is usually sufficient in quantity to carry along with it all grit dropping into trough 53. If it is not, an additional stream of liquid such as water may be applied for this purpose. The material drawn off through the pipe 62 will be in proper condition for use, having been subjected to the two separating actions taking place in the main and auxiliary separators.

It has been found that the use of the headbox 65 with piping connections as described insures a uniform supply of material to the riddles or separators, and it also substantially prevents the settling of the slurry and the consequent clogging of the piping connections. The constant supply of material to the headbox through pipes 68 serves to maintain the material in the box in a state of constant agitation to prevent the settling action refered to.

From the foregoing it will be apparent that the present apparatus provides for both separation or classification of the material, and for the washing thereof to prevent the loss of any valuable material which may adhere to the grit after the latter has been subjected to the separating action. It also provides a method whereby the washing action is combined with a classification feature whereby fine solids may be separated from the grit at the same time as the grit is freed of soluble material. The apparatus is continuous and efficient in operation, the efficiency of the system resulting from the combination of the washing and classifying action with the separating action.

From the foregoing it will be apparent that the present apparatus provides for the carrying out of the method involved wherein the material to be treated is first subjected to a separating action, and wherein the coarser material separated from the mass is subjected to a washing action to prevent the loss of material passing out of the apparatus with the grit. The method further contemplates a two-stage separating action to insure a supply of fines and solubles without the presence of any coarse material therein, and any coarse material separated in the second separating stage is returned to the material washed from the grit to be reseparated.

It is to be understood that the form of apparatus shown and described and the details of procedure of the method may be varied without departing from the spirit of the invention or the scope of the subjoined claims.

I claim:

1. Apparatus of the character described comprising a pair of separating devices each including a screen, means for supplying material to the screens of said separating devices, a pair of pans adapted to be arranged beneath the respective screens of the separating devices to receive material passing through the screens, a connection between said pans adapted for the flow of liquids, a washing through for receiving from said separating devices the material retained on the screens thereof, means for supplying a washing liquid to said trough, a duct for drawing off the washing liquid and material therein from said trough, a third separating device including a screen, a third pan adapted to be arranged beneath the screen of the third separating device, means for delivering material received in said pair of pans to the screen of the third separating device, and means for delivering material retained on the screen of the third separating device to said duct.

2. Apparatus of the character described comprising a separating device including a screen, means for supplying material to said screen, a pan arranged beneath said screen to receive material passing therethrough, a washing receptacle adapted to receive material retained on said screen, means for supplying a washing liquid to said receptacle, a duct for drawing off the washing liquid and material therein from said receptacle, a second separating device including a screen, means for conducting material from said pan to the screen of said second separating device, a second pan arranged beneath the screen of said second separating device, and means for delivering material retained on the screen of said second separating device to said duct.

3. Apparatus of the character described comprising a pair of separating devices each including a screen, a pair of receivers arranged beneath the screens of the respective separating devices to receive material passing through said screens, the bottom of one of said receivers sloping downwardly toward the other receiver, a connection between said receivers, the bottom of said connection and the bottom of said other receiver being sloped and lying in the plane of the sloping bottom of said first named receiver, and single means for drawing off material from said other receiver adjacent the low point in the bottom thereof.

HAROLD ROBERT RAFTON.